United States Patent
Sack

(10) Patent No.: US 10,176,153 B1
(45) Date of Patent: Jan. 8, 2019

(54) GENERATING CUSTOM MARKUP CONTENT TO DETER ROBOTS

(71) Applicant: Amazon Technologies, Inc., Seattle, WA (US)

(72) Inventor: Joseph Martin Sack, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 194 days.

(21) Appl. No.: 14/497,179

(22) Filed: Sep. 25, 2014

(51) Int. Cl.
| | |
|---|---|
| G06F 17/00 | (2006.01) |
| G06F 17/22 | (2006.01) |
| G06F 21/44 | (2013.01) |
| H04L 29/06 | (2006.01) |
| G06F 17/24 | (2006.01) |

(52) U.S. Cl.
CPC ........ *G06F 17/2247* (2013.01); *G06F 17/243* (2013.01); *G06F 21/44* (2013.01); *H04L 63/1441* (2013.01)

(58) Field of Classification Search
CPC ............................ G06F 17/243; H04L 63/1441
See application file for complete search history.

(56) References Cited

U.S. PATENT DOCUMENTS

| | | | | |
|---|---|---|---|---|
| 6,931,532 B1* | 8/2005 | Davis | ................. | G06F 21/6209 380/273 |
| 7,139,916 B2* | 11/2006 | Billingsley | ............. | G06F 21/36 380/255 |
| 7,805,523 B2* | 9/2010 | Mitchell | ........... | G06F 17/30902 709/203 |
| 7,945,952 B1* | 5/2011 | Behforooz | ............ | G06F 21/316 713/155 |
| 8,769,636 B1* | 7/2014 | Nelson | .................. | H04L 9/0861 726/5 |
| 9,336,191 B2* | 5/2016 | Hauser | .................. | G06F 17/241 |
| 2011/0131652 A1* | 6/2011 | Robinson | ............ | H04L 63/1408 726/22 |
| 2011/0307486 A1* | 12/2011 | Breslau | ............... | G06F 21/6245 707/737 |
| 2012/0022942 A1* | 1/2012 | Holloway | ........... | H04L 63/1458 705/14.49 |
| 2015/0169187 A1* | 6/2015 | Calvelo Aros | ........ | G06F 11/302 715/704 |

(Continued)

OTHER PUBLICATIONS

Botcha Spam Prevention, posted Dec. 6, 2010, Drupal TM, p. 1-7, available at https://www.drupal.org/project/botcha.*

(Continued)

*Primary Examiner* — Amelia L Tapp
(74) *Attorney, Agent, or Firm* — Knobbe, Martens, Olson & Bear, LLP

(57) ABSTRACT

Systems and methods are provided for determining customized markup content to deter malicious attackers and/or to decrease electronic submissions from robots. In some embodiments, markup content may be randomized with unique identifiers, reordering of markup elements, and/or insertion of hidden markup elements. The modifications to markup content may have no impact on human usability of the markup content. However, the customized markup content may render the content unusable by a programmed, automated attacker that cannot parse and/or recognize the content. Thus, automated attackers are deterred from using markup content, while human users remain unaffected.

19 Claims, 8 Drawing Sheets

(56) References Cited

U.S. PATENT DOCUMENTS

2018/0067908 A1\* 3/2018 Cardno ................ G06F 17/218

OTHER PUBLICATIONS

Stack Overflow, "How to prevent robots from automatically filling up a form?" retrieved from http://stackoverflow.com/questions/2387496/how-to-prevent-robots-from-automatically-filling-up-a-form on May 25, 2016, p. 1-13.\*
Coyier, "Serious Form Security" published May 19, 2009, CSS Tricks, p. 1-12, retrieved from Internet Archive Wayback Machine, https://web.archive.org/web/20090605202748/http://css-tricks.com/serious-form-security.\*

\* cited by examiner

```
<markup>
    ----------
    <form>
        <div>Full Name</div>
        <input id="fullName" />
        <div>Phone Number</div>
        <input id="phoneNumber" />
        ------
    </form>
    ------
</markup>
```
502

```
<markup>
    ----------
    <form>
        <div>Full Name</div>
        <input id="cdc81616b0b040c1b4154771feb7f393" />
        <div>Phone Number</div>
        <input id="671abe6d92894fa8bfd003c120747b4d" />
        ------
    </form>
    ------
</markup>
```
520

*Fig.5.*

```
<markup>
    ......
    <form>
        <div>Full Name</div>
        <input name="fullName" />

<div>Phone Number</div>
        <input name="phoneNumber" />
        ..........
    </form>
    ......
</markup>
```
602

```
<markup>
    ......
    <style>
        .cdc816 {
            position: relative;
            top: -20px;
        }
        .adc817 {
            position: relative;
            top: 40px;
        }
        .xdc816 {
            position: relative;
            top: 60px;
        }
        .jdc818 {
            position: relative;
            top: 40px;
        }
        ......
    </style>
    <form>
        <input class="adc817" name="cdc81616b0b040c1b4154771feb7f393" />
        <div class="xdc816">Phone Number</div>
        <div class="cdc816">Full Name</div>
        <input class="jdc818" name="671abe6d928294fa8bfd003c120747b4d" />
        ......
    </form>
    ......
</markup>
```
620

Full Name

Phone Number

Email Address

Password

Create your account
702 www.electronicform.com

700

| Session | Resource | Element Type | Element Value | Unique Identifier |
|---|---|---|---|---|
| 1 | 1 | id | fullName | cdc81616b0b040c1b4154771feb7f393 |
| 1 | 1 | id | phoneNumber | 671abe6d92894fa8bfd003c120747b4d |
| 1 | 2 | name | Address | 2024bb7798c043628e98e1d9bfb5c300 |
| 3 | 3 | id | emailAddress | 38f6cb0bd7cc4e44b2158a22603b8923 |
| 2 | 1 | id | fullName | d213e85a5189428c9b9477dc5c9c8f51 |

GENERATING CUSTOM MARKUP CONTENT TO DETER ROBOTS

BACKGROUND

Generally described, computing devices may provide network content or services. Some network content or services are only available to users after a user creates an account or otherwise provides personal information, such as name, email address and/or other information. Typically, account creation requires submitting one or more forms with information related to the user. Malicious attackers use automated scripts or robots (sometimes referred to as bots) to repeatedly complete network forms to achieve some benefit or gain, such as gaining access to network content or services. One response to malicious attackers is to implement a test to distinguish between humans and computers or automated scripts. For example, the Completely Automated Public Turing test to tell Computers and Humans Apart ("CAPTCHA") is commonly used that may display text as a graphic, which may be partially obscured or distorted, and require the user to respond with an answer. If a user cannot correctly answer the CAPTCHA, then access to the network form, content, or service may be denied.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein:

FIG. 5 illustrates an example modification of a markup resource.

FIG. 6 illustrates another example modification of a markup resource.

FIG. 7 is a pictorial diagram of an illustrative form corresponding to a modified markup resource.

FIG. 8 illustrates an example translation data structure for modifying markup content and/or for translating response data.

DETAILED DESCRIPTION

Figure 1:
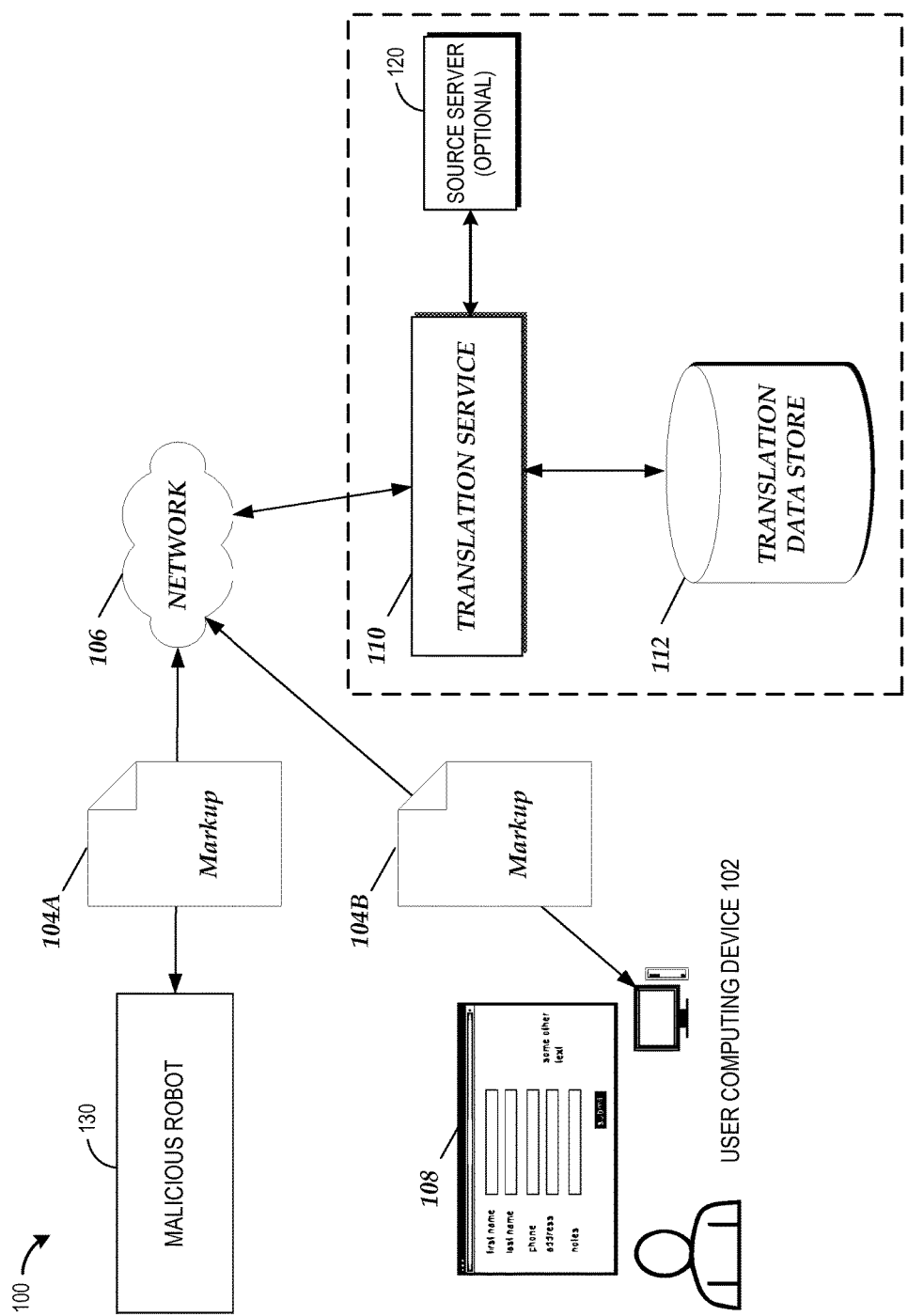
FIG. 1 is a schematic block diagram depicting an illustrative network environment for implementing a translation service to modify markup content and/or resources to thwart malicious attackers and/or robots.

Generally described, aspects of the present disclosure are directed to a system and method for translating and/or modifying a network resource, such as a web page or other network-accessible page, to deter malicious attackers, robots (such as an automated script) and/or other non-human submitters or crawlers of data. For example, a malicious attacker may request a web page including a form that must be completed to achieve some benefit and/or gain. The web page may include markup elements (e.g., fields and/or inputs) with identifiers that indicate context and/or information about the markup elements. Furthermore, the relative positions of the markup elements may further include information and/or context regarding the web page. For example, text data for describing input fields and/or elements may be proximate to and/or near the input elements in the network resource. The system may then generate a custom page to replace the identifiers of the markup elements with random strings and/or characters. Additionally or alternatively, the relative positions of the markup elements in the custom page may be further randomized and/or reordered while maintaining the ultimate display position of each element when the web page is later interpreted by a browser for display. The custom page can then be provided to the malicious attacker who is unable to complete the network form because the modifications to the custom page render the page unparsable and/or render the markup content unusable.

There may be advantages to modifying markup resources and/or content. For example, human users and robots may be provided the same and/or similar custom network resources. In some embodiments, a translation service may provide the same and/or similar custom network resources to both human end users and robots without any analysis and/or information regarding whether the requester is a human or robot. However, unlike the automated script that was unable to complete the network form, the human user may be able to complete the network form because the modifications to the custom network resource may be configured to have little or no impact on human usability or visual perception of the network form. Another advantage may include integrating the modification processes with existing platforms and/or systems for providing network content. For example, a translation service may be configured and/or integrated with a network system to receive network resources and/or content before the network data is transmitted to its destination. The translation service may be further be configured to receive response data associated with completed network forms and translate the response data by replacing unique identifiers with their original identifiers. Furthermore, the techniques described herein may provide a better customer and/or user experience because a user may not need to complete CAPTCHAs to verify he or she is not a robot. CAPTCHAs may provide a poor customer experience because the difficulty level of the CAPTCHA for a robot may correlate with the difficulty level a human has to complete the CAPTCHA. Thus, a translation service may seamlessly integrate with a network system and/or network content provider to provide customized network resources that are unusable by malicious attackers and/or robots without affecting the human user experience.

The term "markup," as used herein, refers to any data and/or data format associated with an annotation syntax. Example markup formats and/or languages may include Hypertext Markup Language ("HTML"), Extensible Markup Language ("XML"), Scalable Vector Graphics ("SVG"), XHTML, etc. Markup languages, such as HTML, may be associated with styling instructions that describe the look and/or formatting of a resource in a markup language. For example, Cascading Style Sheets ("CSS") is a language that may be used to style the look and/or layout of an HTML resource and/or page. One skilled in the art will appreciate that aspects of the present disclosure, including but not limited to replacing certain strings with randomized identifiers, may be applicable to content that would not ordinarily be considered markup data, such as scripts. For example, a client-side script that dynamically generates form content or related content for display may have the names and/or placement of variables and/or functions obfuscated according to aspects of the present disclosure in order to ensure that robots are not able to parse the script to identify specific form elements in the resulting dynamic presentation.

While a network form is often used as an example below, it will be appreciated that methods for deterring malicious attackers, as disclosed herein, may be used in a variety of environments other than for network forms. For example, aspects of the present disclosure, in some embodiments, may be used and/or implemented to detect robots and/or to deter automated network scraping, network crawling, and/or cross-site request forgery ("CSRF"). CSRF is a common type of attack against network resources where unauthorized commands are transmitted from a user that a network application trusts. For example, a human user may be sent a purported selectable identifier (such as a Uniform Resource Identifier or "URI") to view a video, but the URI is actually a command to purchase an item from a retail server (where the user has already been authenticated). The techniques disclosed herein may prevent CSRF because an attacker may not have access to the unique identifiers and/or customized markup content to issue a valid command.

A translation service, as disclosed herein, may be implemented in any of a number of environments in which markup content is presented. For example, the translation service may be implemented as an application to communicate with a source server, which is described in further detail below. In other embodiments, the translation service may be implemented on a separate server and/or computer hardware but may be in communication with and/or may intercept network traffic from the source server. In some embodiments, the translation service may be integrated with a framework, e.g., an application framework, for generating and/or providing markup content. For example, a translation service and/or translation module may be configured as a plug-in and/or package to be integrated with an existing application framework for providing network content.

Turning to FIG. 1, an illustrative network environment 100 is shown in which a translation service may modify markup content and/or translate response data. The network environment 100 may include a user computing device 102, a modified markup resource 104A and/or 104B, a network 106, a translation service 110, a source server 120, a translation data store 112, and a robot and/or malicious attacker 130. The constituents of the network environment 100 may be in communication with each other either locally or over the network 106.

In some embodiments, source server 120 may implement and/or be in communication with translation service 110. The optional source server 120 may be configured to provide network resource pages and/or markup content, such as pages associated with an electronic catalog for shopping. Source server 120 includes one or more computing devices that may perform a variety of operations to implement a translation service. Translation service 110 and/or source server 120 may receive unmodified markup resources to translate the resources and/or make them available via network 106. For example, modified markup resources 104A and/or 104B may be received by malicious robot 130 and/or user computing device 102, respectively. Furthermore, source server 120 and/or translation service 110 may retrieve and/or store unique identifiers from/to the translation data store 112, which is described in further detail below. Additional operations of translation service 110 are described below with respect to FIG. 2.

The user computing device 102 may be any computing device capable of communicating over the network 106 and presenting markup content to a user, such as a laptop or tablet computer, personal computer, personal digital assistant (PDA), hybrid PDA/mobile phone, mobile phone, smartphone, wearable computing device, global positioning system (GPS) device, electronic book reader, set-top or other television box, camera, audiobook player, digital media player, video game console, in-store kiosk, television, appliance, electronic device for inclusion in vehicles or machinery, gaming device, or the like. In some embodiments, the user interface and/or network form shown in FIG. 7, may be presented by user computing device 102. The user computing device 102 may generally be capable of accessing network and/or markup resources, such as content pages, via network 106. Furthermore, user computing device 102 may be capable of transmitting response data and/or network data to a destination, such as translation service 110 and/or source server 120.

Modified markup resource 104A and 104B may correspond to the same and/or similar network page and/or resource (such as having been derived from the same source file and/or resource by the translation service). However, resources 104A and 104B may be transmitted to different destinations, e.g., malicious robot 130 and user computing device 102, respectively. For example, markup resource 104A and 104B may differ in that each includes different unique identifiers, in some embodiments. A user accessing modified markup resource 104B via user computing device 102 may be presented with network form 108 within a user interface. In some embodiments, modified markup resource 104B may be usable to a human user (as would modified markup resource 104B, if that were sent to the user), however, modified markup resource 104A may not be usable by malicious robot 130 because of randomized modifications and/or elements in modified markup resource 104A.

The user computing device 102 may further be capable of presenting audio and visual content, images, video content, text, user interfaces, and/or user interface controls on a display screen. The user computing device 102 may further be capable of receiving user input through a user input device, such as a keyboard, mouse, touchpad, microphone, trackball, touchscreen, image recognition through an input camera (e.g., eye, hand, head, body tracking and/or placement), gamepad, accelerometer, gyroscope, or other input device known in the art.

The network 106 may be any wired network, wireless network, or combination thereof. In addition, the network 106 may be a personal area network, local area network, wide area network, cable network, satellite network, cellular telephone network, or combination thereof. In addition, the network 106 may be an over-the-air broadcast network (e.g., for radio or television) or a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks, such as the Hypertext Transfer Protocol ("HTTP"). Protocols and components for communicating via the Internet or any of the other aforementioned types of communication networks are well known to those skilled in the art of computer communications and thus, need not be described in more detail herein.

The translation data store 112 may electronically store, in some embodiments, unique identifiers and/or network session data, as further discussed below. The translation data store 112 may be embodied in hard disk drives, solid state memories, any other type of non-transitory computer-readable storage medium, and/or a file, a database, an object orientated database, document store, a relational database, in-memory cache, and/or stored in any such non-transitory computer-readable media accessible to the translation service 110. The translation data store 112 may also be distributed or partitioned across multiple local and/or remote storage devices without departing from the spirit and scope of the present disclosure. In some embodiments, the translation data store 112 is a data storage web service.

The user computing device 102 and translation service 110 may each be embodied in a plurality of devices. The user computing device 102 and/or translation service 110 may include a network interface, memory, processing unit, and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and translation service 110. The memory generally includes RAM, ROM, and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the translation service 110 may be represented in a single physical server or, alternatively, may be split into multiple physical servers. In some embodiments, the entire translation service may be represented in a single computing device, such as user computing device 102. Additionally, the environment 100 may not include a network 106.

Additionally, in some embodiments, the translation service is implemented by one more virtual machines implemented in a hosted computing environment. The hosted computing environment may include one or more rapidly provisioned and/or released computing resources. The computing resources may include hardware computing, networking and/or storage devices configured with specifically configured computer-executable instructions. A hosted computing environment may also be referred to as a "cloud" computing environment.

Figure 2:
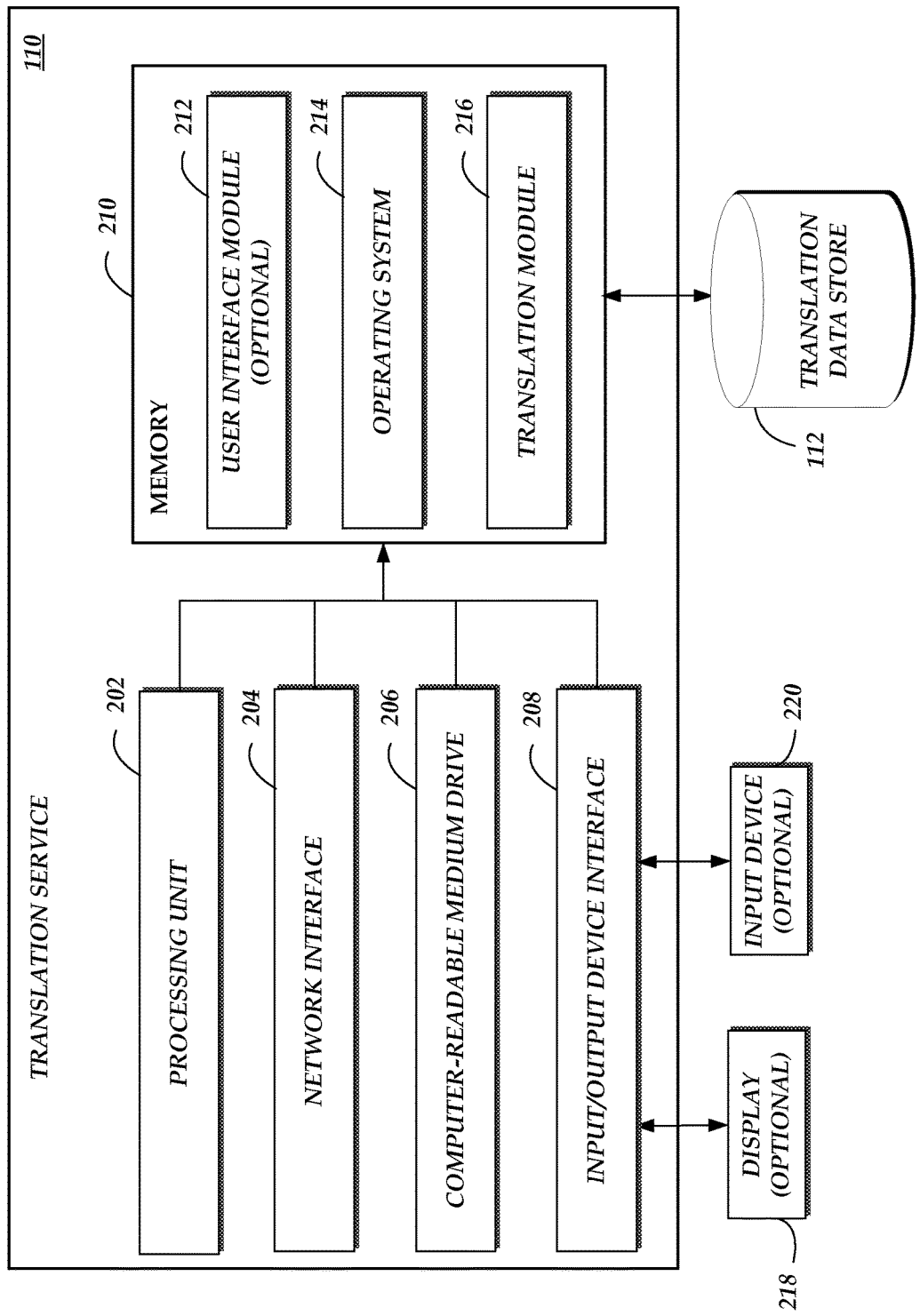
FIG. 2 is a schematic block diagram depicting an illustrative translation service of the network environment depicted in FIG. 1.

FIG. 2 is a schematic diagram of the illustrative translation service 110 shown in FIG. 1. The translation service 110 includes an arrangement of computer hardware and software components that may be used to implement the translation service. FIG. 2 depicts a general architecture of translation service 110 illustrated in FIG. 1. Those skilled in the art will appreciate that translation service 110 may include more (or fewer) components than those shown in FIG. 2.

Translation service 110 may include a processing unit 202, a network interface 204, a non-transitory computer-readable medium drive 206, and an input/output device interface 208, all of which may communicate with one another by way of a communication bus. As illustrated, translation service 110 is associated with, or in communication with, an optional display 218 and an optional input device 220. The display 218 and input device 220 may be used in embodiments in which users interact directly with the translation service 110, such as to view and/or preview a modified and/or custom network resource. In other embodiments, the display 218 and input device 220 may be included in the user computing device 102 shown in FIG. 1. The network interface 204 may provide translation service 110 with connectivity to one or more networks or computing systems. The processing unit 202 may thus receive information and instructions from other computing systems (such as the user computing device 102) or services via network 106. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, accelerometer, gyroscope, or gestures recorded via motion capture and/or image recognition (e.g., eye, hand, head, and/or body part placement and/or recognition). The input/output device interface 220 may also output audio data to speakers or headphones (not shown).

The memory 210 may contain specifically configured computer program instructions that the processing unit 202 executes in order to implement one or more embodiments of the translation service. The memory 210 generally includes RAM, ROM and/or other persistent or non-transitory computer-readable storage media. The memory 210 may store an operating system 214 that provides computer program instructions for use by the processing unit 202 in the general administration and operation of the translation service 110. The memory 210 may further include other information for implementing aspects of the translation service. For example, in one embodiment, the memory 210 includes a user interface module 212 that facilitates generation of user interfaces (such as by providing instructions therefor) for display upon a computing device. For example, a user interface may be displayed to allow a developer and/or human operator to select markup elements that may be repositioned and/or otherwise preview randomized markup customizations. In addition, the memory 210 may include or communicate with the translation data store 112.

In addition to the user interface module 212, the memory 210 may include a translation module 216 that may be executed by the processing unit 202. In some embodiments, translation module 216 may implement various aspects of the present disclosure. For example, translation module 216 may generate modified and/or custom markup resources, translate response data with unique identifiers, and/or other aspects of the disclosure described herein. Translation module 216 may retrieve unique identifiers, store unique identifiers, and/or retrieve session data from translation data store 112. In some embodiments, translation module 216 may communicate and/or provide instructions to the user interface module 212 to provide modified network resources for presentation. The user computing device 102 may locally store or present the markup resource provided by the translation module 216.

While translation module 216 is illustrated as implemented by translation service 110, in other embodiments, the translation service may be implemented partially or entirely by the source server 120. For example, the translation service may be provided as specifically configured hardware and/or specifically configured application software implemented by hardware on source server 120. Accordingly, source server 120 may include translation module 216 and other components that operate similarly to the components illustrated as part of translation service 110, including a processing unit 202, network interface 204, non-transitory computer-readable medium drive 206, input/output interface 208, memory 210, user interface module 212, and so forth.

Figure 3:
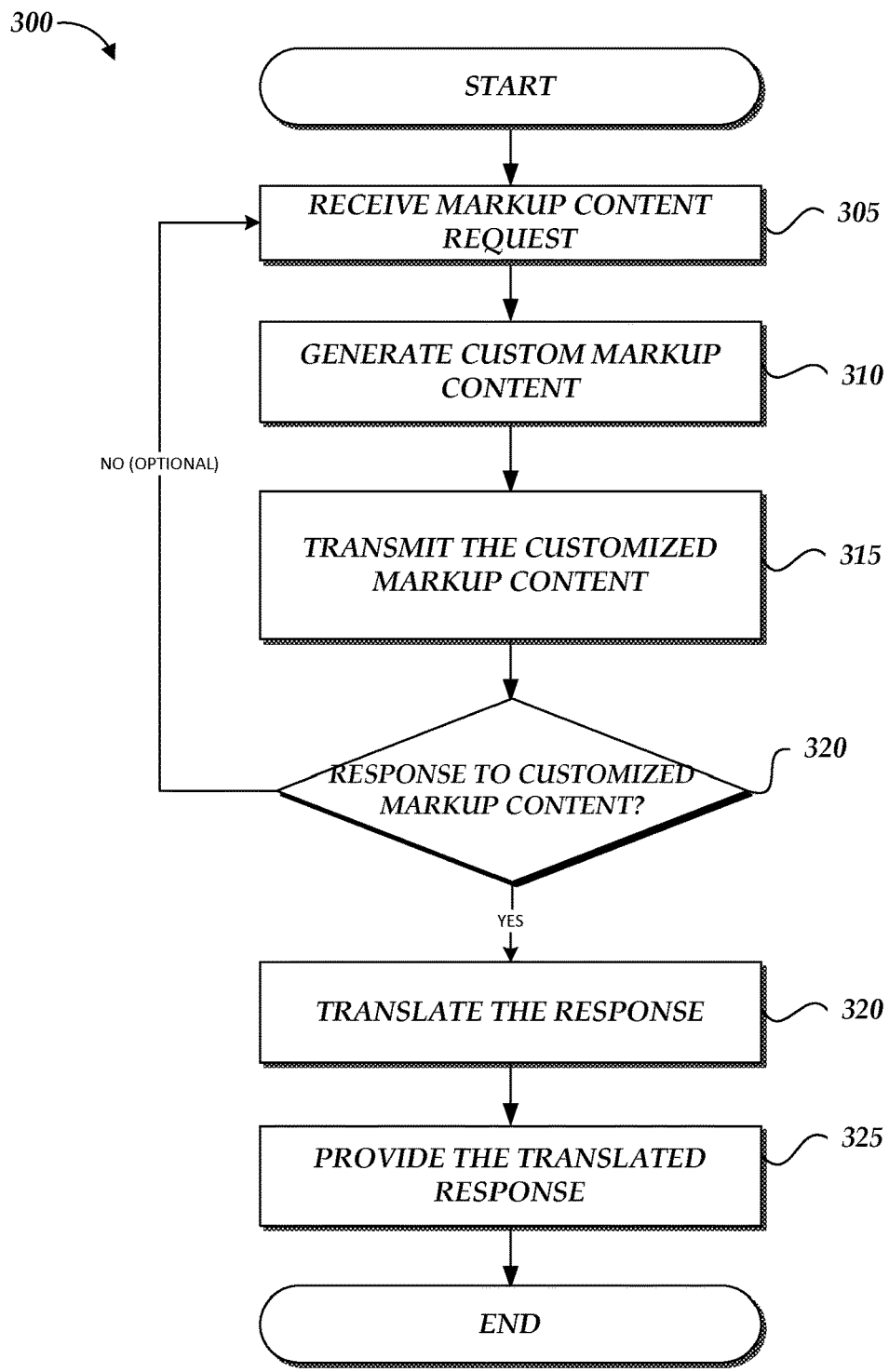
FIG. 3 is a flow diagram depicting an illustrative method for modifying markup content and/or translating the response to modified markup content.

FIG. 3 is a flow diagram depicting an illustrative method 300 implemented by translation module 216 for generating translated markup content and/or translating response data. As discussed above, in some embodiments, translation service 110 may include translation module 216. In other embodiments, source server 120 may include translation module 216, and may implement illustrative method 300. In yet other embodiments, functions of the translation module 216 may be distributed between translation service 110 and source server 120.

Illustrative method 300 begins at block 305, where translation module 216 may receive a request for markup instructions, markup content, and/or a markup resource. For example, a user may request content from source server 120, such as via an HTTP request. Source server 120 may generate and/or retrieve markup content in response to the external request for content. Translation module 216 may receive and/or intercept the generated markup content rather than the content being transmitted externally (such as back to the user device). As discussed above, markup content and/or a markup resource may correspond to a markup language, such as HTML, which may include HTML elements. Furthermore, the request for markup content may include information and/or data regarding a network session and/or other network data. In some embodiments, a network session may be defined by the particular application and/or network framework implementation. For example, when a user accesses a network resource from a network application, the network application and/or source server 120 may store data and/or state information associated with the particular user for a period of time. The storage of data and/or state information associated with the user for a period of time may be known as a session or network session, which may be used by translation module 216 and/or source server 120. In some embodiments, session identifiers may be inserted into network locators, Uniform Resource Locators ("URLs") or other URIs, browser data, cookies, and/or HTTP cookies. Furthermore, the session and/or network session may include data associated with communications, messages, dialogue, requests, and/or responses between source server 120 and the requesters of markup content.

In some embodiments, requests for customized markup content may be received dynamically after some markup content and/or resource has been sent. For example, markup content may include or be associated with scripting instructions or other code to dynamically add content to a network resource. In the example, script instructions in the markup content may allow a user to dynamically add rows to a table, such as invitees for a promotion. Thus, unique identifiers and/or custom markup content may need to be generated for the dynamically added content. Translation module 216 and/or translation service 110 may expose an Application Programming Interface to dynamically receive markup content requests and to transmit custom markup content responses, as described below.

After markup content is received, translation module 216, at block 310, generates custom markup content and/or a custom markup resource based at least in part on the received markup content. In some embodiments, generating custom markup content may be performed by replacing and/or reordering elements of the original markup content. For example, identifiers in markup elements that contain information regarding form elements of the markup content (e.g., "id='phoneNumber'," "id='fullName'," etc.) may be replaced by unique identifiers, such as randomized strings and/or characters, which may not include information as to the nature of the included form elements. Additionally or alternatively, markup content may be customized by inserting elements, such as styling instructions, into the original markup content. Examples of generating custom markup content are described in further detail below with respect to FIGS. 4, 5, 6, and/or 8.

At block 315, translation module 216 transmits the generated custom markup content. For example, translation module 216 may transmit the custom markup content to the original external requester of the markup content, such as computing device 102 or robot 130. Transmission of the custom markup content may occur via one or more communication protocols described above. In some embodiments, translation module 216 provides the custom markup content to source server 120 and/or source server may then transmit the custom markup content to the original requester. As discussed above, original requesters of markup content may include malicious attackers and/or automated scripts 130, as well as user computing devices 102 from humans.

At decision block 320, translation module 216 may determine whether there has been a response to the transmitted custom markup content. For example, the custom markup content may include a form containing one or more fields that may be completed by a user and/or script. In some embodiments, completion of the form fields and/or a user request to submit the form may automatically transmit response data to source server 120, which may then be intercepted and/or received by translation module 216 before source server 120 processes the form response. In some embodiments, the source server 120 may receive the response and subsequently pass all or a portion of the response to the translation module 216. If no response data has been received, translation module 216 may return to block 305 to receive additional markup content requests (which may be from other users and/or scripts). It will be appreciated that translation module 216 may operate in a multi-threaded manner to concurrently receive markup content requests and/or responses transmitted in association with customized markup content. If response data has been received, translation module 216 continues to block 320 discussed below. In some embodiments, instead of decision block 320, translation module 216 waits to receive response data. For example, depending on the embodiment and implementation of source server 120, response data associated with a transmitted custom network resource may not be received for minutes or hours, for example, and may be accepted and processed by translation module 216 and/or source server 120 at any time during a predetermined time period (such as one day from the initial transmission of the custom network resource).

At block 320, translation module 216 translates the response data. For example, the response data may include data associated with values and/or strings that were submitted in response to the input elements of the transmitted custom markup resource. The response data may also include an optional session identifier that may correspond to the network session of the markup content requests. However, the response data may be unintelligible and/or incompatible to be used by the source server 120 because the response data was based on the customized markup resource generated by the translation service 110, which may have included unique identifiers. Thus, translation module 216 may revert or translate the unique identifiers back to the original identifiers from the original markup resource. The mapping of unique identifiers to the original identifiers may be retrieved by the translation module 216 from the translation data store 112. Furthermore, the translation of unique identifiers may be further facilitated and/or optimized by using the network session identifier and/or an index of unique identifiers. The mapping, data structures, indexes, and/or session identifiers associated with translating unique identifiers is described in further detail with respect to FIGS. 4 and 8.

At block 325, the translation module 216 provides the translated response data to source server 120 and/or some other recipient, as configured in a given embodiment. For example, input values associated with the original identifiers from the original markup resource may be provided to source server 120. The input values may correspond to form elements such as name, phone number, address, etc. Furthermore, the input values may be provided in a format matching the original identifiers from the original markup resource, or that are otherwise compatible with and/or configured for source server 120. This may be important because source server 120 may expect the original identifiers and/or may not function properly unless the original identifiers are inserted into the response data. Thus, responses to custom markup resources, which may be provided by human users and generally not by automated scripts, may be translated and provided to source server 120 to allow source server 120 and/or network applications to function in their intended manner without an adverse impact to the user experience.

Figure 4:
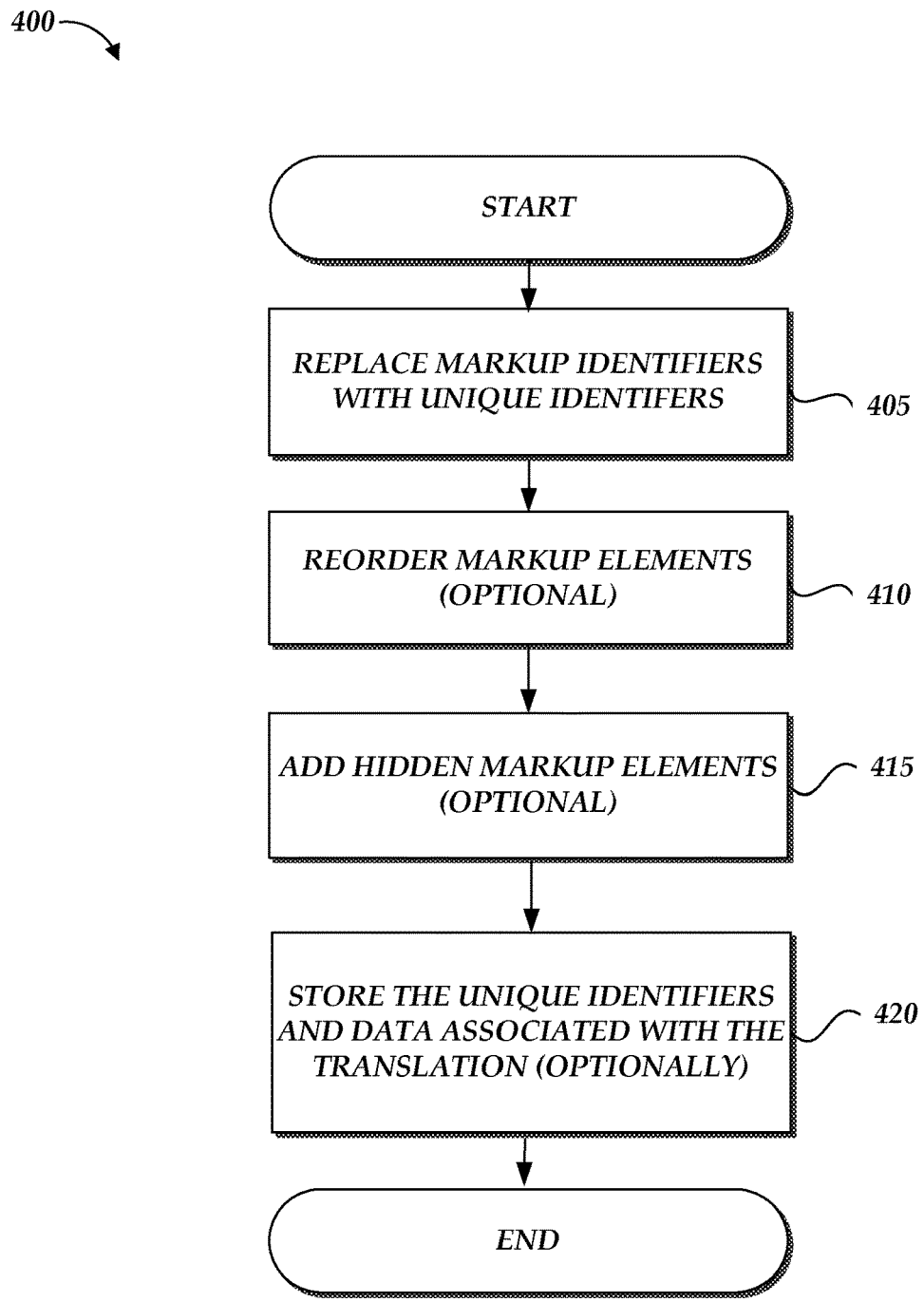
FIG. 4 is a flow diagram depicting an illustrative method for modifying markup content with unique identifiers and/or otherwise modifying the markup content.

FIG. 4 is a flow diagram depicting an illustrative method 400 implemented by the translation module 216 for modifying markup content with unique identifiers and/or otherwise modifying the markup content. In some embodiments, similar to illustrative method 300, translation service 110 may include translation module 216, and may implement illustrative method 400. In other embodiments, the source server 120 may include the translation module 216, and may implement illustrative method 400. In yet other embodiments, functions of the translation module 216 to implement illustrative method 400 may be distributed between translation service 110 and source server 120. Some of the blocks of illustrative method 400 may be implemented by the translation module 216 to generate custom markup content. Thus, some of the blocks of illustrative method 400 may be similar to block 310 of FIG. 3 described above. For example, some of the features and/or functions of illustrative method 400 may be implemented by translation service 110 and/or translation module 216.

At block 405, translation module 216 replaces identifiers in markup elements with unique identifiers. In some embodiments, translation module 216 may parse markup content to dynamically identify markup elements that include or are associated with identifiers that may be replaced. For example, markup languages such as HTML may use attributes within markup elements to convey additional information such as name and/or identifier attributes. Thus, translation module 216 may parse markup content according to the syntax of the markup language to locate identifiers. For example, input element attributes may include "<input id='fullName'/>" or "<input name='phoneNumber'/>." In the example, translation module may replace the "fullName" and/or "phoneNumber" identifiers and/or name attributes with unique identifiers generated by translation module 216. Because the identifiers are never displayed to a typical human user in the user interface generated based on the markup information, such a change has no effect on the content that will actually be displayed. In some embodiments, the elements and/or markup resources to receive unique identifiers may be predefined, such as a table and/or data structure in translation data store 112 indicating the markup attributes to be replaced.

The term "unique identifier," as used herein, refers to any reference number, string, and/or randomized string or number. An example of a unique, replacement, and/or translation identifier includes a Globally Unique Identifier ("GUID"). In some embodiments, unique identifiers and/or GUIDs may not be guaranteed to be unique, however, the chances of a repeating unique identifier may be extremely low and/or negligible due to their implementation. For example, a unique identifier may be generated from random or pseudorandom numbers with 122 random bits such that the total number of unique identifiers is $2^{122}$. Thus, the unique identifiers are so large that the probability of the same number being generated randomly and/or pseudo-randomly twice is negligible. In some embodiments, shorter and/or longer unique and/or replacement identifiers may be used. In some embodiments, unique identifiers may be generated dynamically for each network session and/or markup content request. In other embodiments, one or more sets of unique identifiers may be generated for a particular day and/or based on some configurable period of time. In other words, unique identifiers may be distributed and/or used such that two users on the same day and/or within the same time period receive the same unique identifier for the same markup element instead of unique identifiers for each markup content request and/or session. Enhancements and/or optimizations to generating and/or using unique identifiers are discussed in further detail below with reference to FIG. 8.

At block 410, translation module 216 may optionally reorder the markup elements. As discussed above and below, malicious attackers may use the relative positions of markup elements and/or data in a resource to discern and/or use information in the markup content to achieve some benefit and/or gain. For example, the text data describing input elements, such as "Name," may be proximate, above, and/or adjacent to corresponding input elements. Thus, the ordering of markup elements within a resource may further hamper automated scripts intending to parse those markup resources. However, additional styling instructions may be necessary because simply reordering markup elements may result in an unintelligible resulting user interface as viewed by a human user in a browser application. As discussed above, styling instructions, such as CSS, may be used to rearrange and/or reorder markup elements. In some embodiments, the styling instructions and/or CSS may be customized and/or configured for particular browser application compatibility. Thus, a custom markup resource with reordered elements may be intelligible and/or usable by a human user because the presentation of the custom markup resource may be modified by the styling instructions at the time of presentation. In some embodiments, types of styling instructions, such as those found in CSS, may include positioning properties such as static positioning, fixed positioning, relative positioning, absolute positioning, overlapping elements, and/or some combination thereof. In some embodiments, the reordering of markup elements and/or the use of styling instructions may deter automated scripts because the automated script may need to render and/or execute the markup instructions to determine and/or extrapolate the relative positions of markup elements, which may be difficult to accomplish programmatically.

The reordering and/or repositioning of markup elements by translation module 216 may be accomplished by first identifying those markup elements that may be reordered. Translation module 216 may dynamically identify markup elements to be repositioned. In some embodiments, an operator and/or developer of network and/or markup resources may identify those markup elements that may be repositioned with attributes and/or tags in the network and/or markup resources. In some embodiments, some markup elements may be randomly and/or pseudo-randomly reordered without automatically generated styling instructions. Thus, a developer and/or operator may generate the original markup content by organizing and/or selecting the markup elements that can be reordered and/or generate styling instructions to allow the random reordering of particular markup elements. In yet other embodiments, translation service 110 may provide a user interface for identifying, selecting, and/or tagging markup elements that may be repositioned.

In some embodiments, after identifying markup elements to be reordered, translation module 216 may dynamically determine the relative positions of the markup elements in the resource document and/or file. The original positioning of markup elements may be stored in a data structure such as an array and/or hash map. For example, markup elements "<input id='fullName'/>" or "<input name='phoneNumber'/>" may be at lines forty or fifty in the resource document and/or file, respectively. Translation module 216 may then randomly and/or pseudo-randomly reposition the identified markup elements to updated positions within the modified markup resource (e.g., markup elements "<input id='fullName'/>" or "<input name='phoneNumber'/>" may be move to lines seventy-five or fifteen in the resource document and/or file, respectively). Translation module 216 may calculate and/or determine the offset values of the relative positions of the reordered markup elements. In some embodiments, offsets may be calculated by comparing the updated positions with the original positions in the resource document and/or file. Furthermore, the offset values may be used by translation module 216 to generate styling instructions that may be inserted into the modified markup resource. The execution and/or interpretation of the modified markup resource with the generated styling instructions in a browser application may cause the presentation of corresponding visual elements as if the original markup resource (with elements in their original positions of the document and/or file) was executed and/or interpreted. In some embodiments, additional unique identifiers may be used for specific styling instructions because the styling instructions may be configured and/or customized for each reordered element. An example of customized styling instructions, repositioning of markup elements, and the use of unique identifiers is described in further detail below with reference to FIG. 6.

At block 415, translation module 216 may optionally insert hidden markup elements into the custom markup resource. For example, an attribute and/or type of an input element may have the value of "hidden," which may be a specific markup instruction and/or tag to hide an element. Alternatively, input elements may be placed such that they are obscured in presentation by other page elements or have a zero or near-zero display size, either of which may result in a human user never seeing these input elements. In other words, hidden input elements of a markup resource may not be presented in a browser application presenting the markup resource. Thus, hidden input elements may not be visible to a human user. However, an automated script may not distinguish between actual input elements and hidden input elements. As a result, an automated script and/or malicious attacker may submit and/or complete a network form by responding to the hidden input elements. Therefore, translation module 216 may detect that a hidden input element has been completed and/or may drop the response data corresponding to the submitted hidden input. Furthermore, while the form presented to a user may only include two fields (such as fields requesting name and email address), an automated script or robot may perceive the presence of many more unrecognized and seemingly required fields (which are hidden from a human user) and decide not to submit the form at all. In other words, hidden input elements may be used to detect and/or deceive malicious attackers. Advantageously, hidden input elements may be combined with other markup customization techniques disclosed herein. For example, if a malicious attacker is able to defeat one or more of the customization techniques described herein and submit response data, hidden input elements may serve as a fallback check for translation service 110 and/or translation module 216 to drop response data if it contains submitted data associated with hidden input elements.

In some embodiments, one or more techniques for robot detection may be used to optionally enable a request for custom markup content and/or to select the particular customization techniques that may be applied. For example, known techniques for robot detection may include unusual "user agent" fields and/or browser name/signatures, the frequencies of their visits, the order of content requests, patterns of content requests and/or visits, blacklists for known robot IP addresses, and/or the types of requested content. Thus, customized markup content and/or particular combinations of markup customizations may be provided for content requests from suspected robot attackers. For example, markup customizations may include: 1) generation of unique identifiers for "id" or "name" attributes, 2) reordering of markup elements, and/or 3) insertion of hidden input elements, which are described above. In some embodiments, a particular markup customization package may include any combination of the above markup customizations and/or certain markup customizations may be used for suspected robot attackers. For example, if there has been a detected robot attacker, then the reordering of markup elements may be enabled because reordering of markup elements may have an adverse impact on presentation of a markup resource to a human user. In other words, particular markup customizations may be prioritized based on their riskiness factor and/or on indicia that a malicious attacker has requested content.

At block 420, translation module 216 may optionally store the generated unique identifiers and/or other data associated with the customized markup resources. As described above, unique identifiers may be generated and/or stored for each network session and/or markup content request. In some embodiments, unique identifiers and/or customization data may be refreshed periodically. For example, translation module 216 may generate a hundred sets of active unique identifiers and/or customized markup resources. In some embodiments, the unique identifiers and/or customized markup resources may be generated daily and/or based on some configurable interval. In other words, sets of unique identifiers and/or customized markup resources may be cached to optimize responses to requests for network content. When a particular content request is received, translation module may randomly, pseudo-randomly, semi-randomly, and/or use a round robin method to choose one of the hundred sets of unique identifiers and/or the particular customized markup resource. For example, in a load balanced system of one or more source servers 120, each source server may be associated with a set of unique identifiers and/or cached customized markup resources. Thus, a different custom markup resource may be provided depending on the particular content server 120 to which a request is forwarded. In some embodiments, some or all of the one hundred sets of unique identifiers and/or sets of customized markup resources may be refreshed. For example, the sets of unique identifiers may be refreshed daily and/or based on some configurable period of time. Thus, even if an attacker is able to decipher and/or discern the randomized elements, they may have to repeat the process within twenty-four hours and/or whenever the unique identifiers and/or customized markup resources are refreshed.

FIG. 5 illustrates an example modification of a markup resource and/or content with unique identifiers by translation service 100 and/or translation module 216. Markup resource 502 includes markup elements (e.g., input elements, textual elements, structural elements, or any element supported by the markup language). In some embodiments, markup resource 502 may correspond to output markup of source server 120. In other words, markup resource 502 may correspond to original source content before it is modified and/or used by the translation service 110. As illustrated, markup resource 502 may correspond to a network form. For example, illustrative markup resource 502 includes input elements, such as "<input id='fullName'/>" for receiving network input data. Illustrative markup resource 502 further includes textual elements, such as "<div>Full Name</div>" corresponding to textual content to be displayed to users. As discussed above, characteristics and/or features of markup resource 502 may be programmatically parsed by a malicious attacker and/or automated script to complete the network form. For example, a malicious script may be programmed to complete forms based on textual content (e.g., "Full Name") and/or element identifiers (e.g., "id='fullName'"). For example, a malicious script may identify that a given input field is intended to accept a person's name based on a lookup table or rule set, then automatically complete the input field with a name. Furthermore, a malicious script may be able to parse and/or complete a network form based on the location of markup elements, such as the positions of textual content and respective input elements (e.g., textual content preceding a respective input element) and/or the relative positions of input elements (e.g., name, phone number, address input elements in that respective order).

As discussed above, translation service 110 may receive markup resource 502 to modify and/or generate custom markup resource 520. Translation service 110 may replace elements of markup resource 502 to generate and/or output markup resource 520. For example, the input element "<input id='cdc81616b0b040c1b4154771feb7f393'/>," which may correspond to a GUID identifier of custom markup resource 520, may correspond to the input element for "fullName" of markup resource 502. As illustrated, the replacement and/or substitution of the "id" attribute of the input element may not contain text and/or strings that may be used by a malicious attacker to discern the nature of the element. The replacement of markup attributes may be advantageous because some or all of those attributes may not affect human usability of a network resource and/or form. For example, a human user viewing custom network resource 520 in a browser may not be presented with the unique identifiers. Therefore, customized markup resource 520 may deter malicious attackers while being usable for human visitors.

As discussed above, unique identifiers may be generated for each network request, session, and/or based on some predefined method. For example, a first user accessing a network location may be provided custom network resource 520. A second user and/or the first user for a different network session may be provided a network resource similar to custom network resource 520 but with different unique identifiers. For example, the input element corresponding to "Full Name" may be assigned unique identifier "df521b85281a469a8421727a53301378," which is different than the unique identifier "cdc81616b0b040c1b4154771feb7f393" of custom network resource 520. Thus, translation service 110 may dynamically provide network resources that are usable to humans but difficult for programmed scripts to parse and/or interpret.

FIG. 6 illustrates an example modification of a markup resource and/or content with elements reordered and/or repositioned by translation service 100 and/or translation module 216. In some embodiments, markup resource 602 may be similar to markup resource 502 of FIG. 5. However, unlike the input elements of markup resource 502 that may be identified by the "id" attribute, the input elements of markup resource 602 may be identified by a "name" attribute. Similar to the modifications and/or creation of a custom markup resource illustrated in FIG. 5, custom markup resource 620 may be generated based at least in part on markup resource 602. Custom markup resource 620 may include one or more style elements to deter malicious attackers. For example, the "<style> . . . </style>" element may contain style instructions and/or sheets to determine the positions and/or locations of corresponding markup elements. The selector ".cdc816" may provide instructions that the corresponding markup element be positioned negative twenty pixels relative to the "top" of the viewport and its normal position in the network resource. Similar to the unique identifiers generated for input elements, unique styling identifiers such as "cdc816" may also be used for styling instructions. For example, selector ".cdc816" may correspond to the textual element "<div class="cdc816">Full Name</div>." As such, the styling instructions of custom markup resource 620 may indicate that the textual element for "Full Name" should be positioned negative twenty pixels relative to its "normal" position, e.g., the position of the element without any styling instructions. In some embodiments, the order of the styling instructions and/or blocks may be randomized and/or may have no impact on the presentation of the markup resource to a user. For example, the styling blocks corresponding to selectors ".cdc816," ".adc817," ".xdc816," and/or ".jdc818" may be in any order as determined by translation service 110.

The markup elements of markup resource 602 may be reordered to generate custom markup resource 620. For example, markup resource 602 may include at least a textual element ("<div>Full Name</div>") followed by an input element ("<input name='FullName'/>"). Furthermore, the textual and input element pair may be followed by another textual and input element pair (e.g., "Full Name" followed by "Phone Number"). Malicious attackers may use the positions and/or locations of markup elements to programmatically complete a network form and/or some task. For example, custom markup resource 520 of FIG. 5 may contain unique identifiers for input elements, however, the relative locations and/or positions of the markup elements in the markup resource may remain the same. Thus, some malicious attackers may be sophisticated enough to determine the nature of input elements, even those randomized, based on the position of input elements proximate to textual content. In contrast, the markup elements corresponding to a network form of custom markup resource 620 may be reordered and/or repositioned to deter a malicious attacker. For example, the markup element pairs of textual and input elements may not be present in custom markup resource 620. For example, custom markup resource 620 may include an input element, two textual elements, and another input element in that respective order. Furthermore, the textual element adjacent and/or proximate to the nearest input element may not correspond to one another in the custom markup resource 620. For example, textual element "<div class='cdc816'>Full Name</div>" and input element "<input class='adc817' name='cdc81616b0b040c1b4154771feb7f393'/" may both be related to a "Full Name" input, however, the textual and input elements may not be located adjacent and/or proximate to one another in custom markup resource 620. However, the presentation of custom markup resource 620 and markup resource 602 may be identical in the user computing device 102 because of the styling instructions of custom markup resource 620. Thus, the relative positions of markup elements in custom markup resource 620 may provide no information to a malicious attacker, however, there may be no impact to a human user interacting with user computing device 102 that is presenting custom markup resource 620.

As discussed above, random and/or pseudo-random combinations of markup element positions may be generated for each network request, session, and/or based on some predefined algorithm. For example, a first user accessing a network location may be provided custom network resource 620. A second user and/or the first user for a different network session may be provided a network resource similar to custom network resource 620 but with different ordered markup elements and/or different styling instructions. Thus, translation service 110 may dynamically provide network resources that are difficult for programmed scripts to parse and/or interpret because the order and/or positions of markup elements may change for the same network resource.

FIG. 7 is a pictorial diagram of an illustrative network form 700 corresponding to a custom markup resource. For example, network form 700 may correspond to custom markup resource 520 and/or custom markup resource 620 as interpreted by a browser or other application for display to a user. The modified elements of a custom markup resource 520 and/or 620 may be presented to a user as illustrated in network form 700. As illustrated, the layout and/or arrangement of network form 700 may be intelligible and/or usable by a user. For example, the unique identifiers of custom markup resource 520 and/or the actual order of input elements in custom markup resource 620 may not be presented to a user in a network browser application. Furthermore, the "create your account" control 702 may cause a browser application and/or user computing device 102 to transmit response data associated with network form 700 to translation service 110 and/or source server 120.

FIG. 8 illustrates an example translation data structure 800 for modifying markup content and/or for translating response data. For example, translation data structure 800 may be one or more data structures, such as a hash map and/or hash set, tables in a relational database, and/or in-memory cache of the translation data store 112. For example, translation data structure 800 may be in a "NoSQL" and/or "Not Only SQL" database that provides a mechanism for storage and retrieval by any means other than tabular formats used in relational database. In some embodiments, a NoSQL implementation, such as a key-value hash map and/or set, an object orientated database, and/or a document store, may be used to optimize performance in retrieving translation data and/or unique identifiers. For example, original identifier values may be retrieved quickly based on indexes on the unique identifiers. In other examples, translation data structure 800 may be in various formats, such as a data object format, XML, JSON, a file format that is proprietary to the translation service, or any other format. The columns and/or fields shown in translation data structure 800 are illustrative. In some embodiments, there may be additional or fewer columns and/or fields.

In some embodiments, translation data structure 800 may include fields and/or columns for a session, a resource, a markup element type, an element value, and/or a unique identifier. As illustrated, a unique identifier may be stored for each combination of unique fields. In some embodiments, translation data structure 800 may be indexed by one or more of the fields, including session identifier, resource identifier, element types and/or values, and/or the unique identifier. For example, a first user may be associated with session one. The first user requests resource one, which may include elements for full name and phone number. Thus, translation module 216 may insert the first and second rows and/or entries of translation data structure 800 with corresponding unique identifier values. When the first user submits a form and/or transmits response data associated with resource one and session one, translation module 216 may use the first two rows of translation data structure 800 to translate the response data as described above with reference to FIGS. 3 and/or 4. In some embodiments, where the unique identifiers are generated for each network content request, the session, resource, and/or element type column/field may not be necessary. For example, a unique identifier may be sufficient information to identify a content request since each unique identifier is generated per content request. In some embodiments, the unique identifiers may only need to be replaced by the element value. In those embodiments, translation data structure 800 may be indexed by unique identifier for optimal performance (e.g., a key-value lookup in a hash set).

In some embodiments, translation data structure 800 may include a "sets" column and/or field instead of a session column and/or field. For example, as described above, instead of unique identifiers being provided for each unique session and/or user, users and/or requests may receive similar unique identifiers based on assignment to the one or more sets. Thus, also as described above, the unique identifier columns and/or values associated with a particular set may be refreshed based on a configurable interval and/or time. In yet other embodiments, translation data structure 800 may store and/or cache modified markup resources (not illustrated), which may only have to be generated once and/or be periodically refreshed.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conjunctive language such as the phrase "at least one of X, Y and Z," unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y, and at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
an electronic data store; and
a computing system comprising one or more hardware computing devices, said computing system in communication with the electronic data store, and configured to at least:
receive a first markup resource comprising a first input element, wherein the first input element comprises a first identifier associated with the first input element, and wherein the first input element is positioned before a second element within the first markup resource according to an initial order of elements in the first markup resource;
generate a first replacement identifier associated with the first identifier;
store, in the electronic data store, an association between the first identifier associated with the first input element and the first replacement identifier;
generate a first custom markup resource, wherein generating the first custom markup resource comprises:
replacing the first identifier associated with the first input element in the first markup resource with the first replacement identifier;
determining a modified order of elements, wherein the first input element is positioned after the second element according to the determined modified order;
generating Cascading Style Sheets (CSS) instructions associated with the first input element based at least in part on the initial order and the determined modified order;
modifying a position of the first input element within the first custom markup resource based at least in part on the determined modified order; and
inserting the generated CSS instructions into the first custom markup resource;
transmit the first custom markup resource to a second computing device, wherein presentation of the first custom markup resource by the second computing device excludes presentation of the first replacement identifier in the first custom markup resource, and wherein presentation of the first custom markup resource by the second computing device causes display of the first input element and the second element according to the initial order of elements based at least in part on the generated CSS instructions;
receive, from the second computing device, response data comprising the first replacement identifier and a corresponding entry entered by a user of the second computing device;
determine that the entry corresponds to the first input element based at least in part on the association between the first identifier associated with the first input element and the first replacement identifier;

modify the response data by replacing the first replacement identifier in the response data with the first identifier associated with the first input element; and
transmit the modified response data for processing of the entry entered by the user.

2. The system of claim 1, wherein the first identifier associated with the first input element is not present in the first custom markup resource.

3. The system of claim 1, wherein the first replacement identifier comprises a pseudo-randomly generated number or string.

4. The system of claim 1, wherein the computing system is further configured to at least:
generate a second replacement identifier associated with the first identifier, wherein the second replacement identifier is different from the first replacement identifier;
replace the first identifier in the first markup resource with the second replacement identifier to generate a second custom markup resource, wherein a mapping from the second replacement identifier to the first identifier is stored in the electronic data store; and
transmit the second custom markup resource to a third computing device.

5. The system of claim 1, wherein the computing system is further configured to at least:
receive a request from the second computing device comprising at least one of: a user agent field, a browser name, or an IP address; and
detect, in the request, indicia that the second computing device is associated with a non-human submitter,
wherein generating the first custom markup resource is in response to detecting the indicia that the second computing device is associated with the non-human submitter.

6. The system of claim 1, wherein storage of the first identifier is indexed by the first replacement identifier.

7. The system of claim 1, wherein generating the first custom markup resource further comprises inserting a hidden input element into the first custom markup resource, and wherein transmitting the modified response data further comprises:
transmitting an indication that the modified response data includes data associated with the inserted hidden input element of the first custom markup resource.

8. The system of claim 1, wherein the first custom markup resource comprises at least one of HTML, XHTML, XML, or SVG.

9. A computer-implemented method comprising:
receiving a first request, wherein the first request includes at least one of: a user agent field, a browser name, or an IP address;
detecting, in the first request, indicia that a second computing device is associated with a non-human submitter;
receiving a first markup resource comprising a first input element, wherein the first input element comprises a first identifier associated with the first input element, and wherein the first input element is positioned before a second element within the first markup resource according to an initial order of elements in the first markup resource;
in response to the first request, generating a first custom markup resource based at least in part on detecting the indicia that the second computing device is associated with the non-human submitter, wherein generating the first custom markup resource comprises:
replacing, in the first markup resource, the first identifier associated with the first input element with a first replacement identifier;
determining a modified order of elements, wherein the first input element is positioned after the second element according to the determined modified order;
modifying a position of the first input element in the first custom markup resource based at least in part on the determined modified order; and
inserting styling instructions into the first custom markup resource, wherein the styling instructions configure display of the first input element and the second element according to the initial order of elements;
storing an association between the first identifier associated with the first input element and the first replacement identifier;
transmitting the first custom markup resource to the second computing device, wherein presentation of the first custom markup resource excludes presentation of the first replacement identifier;
receiving response data comprising the first replacement identifier and a corresponding entry value;
determining that the entry value corresponds to the first input element based at least in part on the association between the first identifier associated with the first input element and the first replacement identifier; and
generating output based at least in part on the entry value and determining that the entry value corresponds to the first input element.

10. The computer-implemented method of claim 9 further comprising:
receiving a second request;
in response to the second request, replacing the first identifier in the first markup resource with a second replacement identifier to generate a second custom markup resource from the first markup resource, wherein the second replacement identifier is different from the first replacement identifier; and
transmitting the second custom markup resource to a third computing device.

11. The computer-implemented method of claim 10 further comprising:
transmitting the first custom markup resource to a fourth computing device; and
transmitting the second custom markup resource to a fifth computing device.

12. The computer-implemented method of claim 10, wherein the second replacement identifier is updated after a configurable time interval.

13. The computer-implemented method of claim 9, wherein the first identifier associated with the first input element is not transmitted to the second computing device, the second computing device comprising a client computing device.

14. The computer-implemented method of claim 9, wherein the first replacement identifier comprises a pseudo-randomly generated number or string.

15. A computer-readable, non-transitory storage medium storing computer executable instructions that, when executed by one or more computing devices, configure the one or more computing devices to perform operations comprising:
receiving a first request, wherein the first request includes at least one of: a user agent field, a browser name, or an IP address;

detecting, in the first request, indicia that a second computing device is associated with a non-human submitter;

receiving a first markup resource comprising a first input element, wherein the first input element comprises a first identifier associated with the first input element, and wherein the first input element is positioned before a second element within the first markup resource according to an initial order of elements in the first markup resource;

generating a first custom markup resource based at least in part on detecting the indicia that the second computing device is associated with the non-human submitter, wherein generating the first custom markup resource comprises:

replacing, in the first markup resource, the first identifier associated with the first input element with a first replacement identifier;

determining a modified order of elements, wherein the first input element is positioned after the second element according to the determined modified order;

modifying a position of the first input element in the first custom markup resource based at least in part on the determined modified order; and inserting styling instructions into the first custom markup resource, wherein the styling instructions configure display of the first input element and the second element according to the initial order of elements;

storing an association between the first identifier associated with the first input element and the first replacement identifier;

transmitting the custom markup resource to the second computing device, wherein presentation of the first custom markup resource excludes presentation of the first replacement identifier;

receiving response data comprising the first replacement identifier and a corresponding entry value;

determining that the entry value corresponds to the first input element based at least in part on the association between the first identifier associated with the first input element and the first replacement identifier; and generating output based at least in part on the entry value and determining that the entry value corresponds to the first input element.

16. The computer-readable, non-transitory storage medium of claim 15, wherein modifying the position of the first input element in the custom markup resource is based at least in part on a user selected tag associated with the first input element.

17. The computer-readable, non-transitory storage medium of claim 15, wherein the styling instructions comprise Cascading Style Sheets instructions.

18. The computer-readable, non-transitory storage medium of claim 15, wherein the first identifier associated with the first input element is not transmitted to the second computing device, the second computing device comprising a client computing device, and wherein the first identifier associated with the first input element is not present in the first custom markup resource.

19. The computer-readable, non-transitory storage medium of claim 15 further comprising inserting a hidden input element into the first custom markup resource.

\* \* \* \* \*